United States Patent
Goto

(10) Patent No.: US 6,599,998 B1
(45) Date of Patent: *Jul. 29, 2003

(54) METHOD OF PRODUCING A PHOTOGRAPHIC COPOLYMER COUPLER

(75) Inventor: Haruyoshi Goto, Odawara (JP)

(73) Assignee: Fuji Photo Film Co., Ltd., Kanagawa (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/997,087

(22) Filed: Dec. 23, 1997

(30) Foreign Application Priority Data

Dec. 26, 1996 (JP) ............................................. 8-348481

(51) Int. Cl.$^7$ .................................................. C08F 26/06
(52) U.S. Cl. ........................... 526/258; 526/79; 526/89; 526/229; 526/262; 526/232; 526/317.1; 526/319; 526/318.44
(58) Field of Search ................................. 526/258, 262, 526/79, 89, 229, 232, 319, 317.1, 318.44

(56) References Cited

U.S. PATENT DOCUMENTS

| | | | | |
|---|---|---|---|---|
| 3,163,625 A | * | 12/1964 | Firestine et al. ............ | 260/80.5 |
| 3,451,820 A | * | 6/1969 | Umberger .................... | 96/100 |
| 3,755,264 A | | 8/1973 | Testa | |
| 4,080,211 A | * | 3/1978 | Paesschen et al. .......... | 430/548 |
| 4,328,283 A | * | 5/1982 | Nakadate et al. ............ | 428/480 |
| 4,409,320 A | | 10/1983 | Yagihara et al. | |
| 4,596,759 A | * | 6/1986 | Schupp et al. ............ | 430/271.1 |
| 4,626,497 A | * | 12/1986 | Roth et al. .................. | 430/293 |
| 4,921,782 A | | 5/1990 | Helling | |
| 5,582,952 A | * | 12/1996 | Kawamura et al. ......... | 430/166 |
| 5,594,086 A | * | 1/1997 | Vicari ......................... | 526/262 |
| 5,813,452 A | * | 9/1998 | Haruta et al. ................ | 165/133 |
| 5,839,037 A | * | 11/1998 | Larson et al. ................ | 399/249 |
| 5,932,404 A | * | 8/1999 | Chen et al. .................. | 430/512 |

FOREIGN PATENT DOCUMENTS

| | | |
|---|---|---|
| EP | 0058073 A2 | 8/1982 |
| EP | 0379958 A1 | 8/1990 |
| JP | 57 94752 | 6/1982 |
| JP | 58 28745 | 2/1983 |
| JP | 58 224352 | 12/1983 |

* cited by examiner

*Primary Examiner*—Tatyana Zalukaeva
(74) *Attorney, Agent, or Firm*—Birch, Stewart, Kolasch & Birch, LLP

(57) ABSTRACT

There is disclosed a method of producing a copolymer by polymerizing at least two monomers having different reactivity as constitutional components, comprising carrying out a polymerization while adding a monomer component B having high reactivity, to a solution of a monomer component A having low reactivity dissolved in a non-aqueous solvent having a boiling point of 55° C. to 120° C., in the presence of a polymerization initiator. The method can give a copolymer high in solubility and suitable for the processing by the flush vacuum dry system, and the method is excellent from the standpoint of the production capacity and stable/safe production throughout the process.

20 Claims, 1 Drawing Sheet

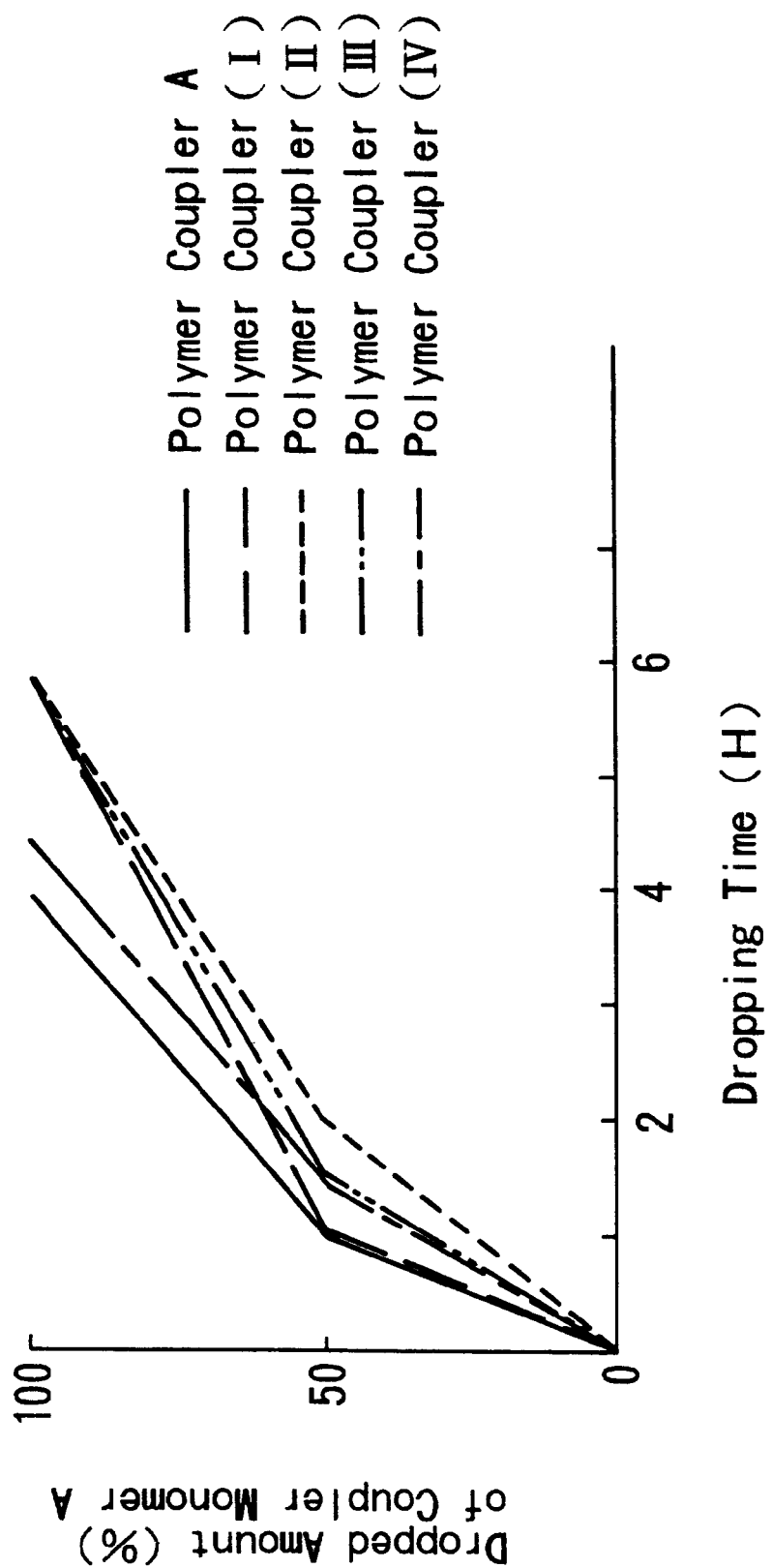

METHOD OF PRODUCING A PHOTOGRAPHIC COPOLYMER COUPLER

FIELD OF THE INVENTION

The present invention relates to a method of producing a copolymer that is preferably used in a production of a photographic copolymer.

BACKGROUND OF THE INVENTION

That copolymer couplers that are made nondiffusible are effective in photographic light-sensitive materials is described, for example, in JP-A-57-94752 ("JP-A" means unexamined published Japanese patent application), JP-A-58-224352, and JP-A-58-28745, and they are put to practical use in commercially available current photographic light-sensitive materials.

In the production of these copolymer couplers, a solvent in the polymerization reaction has been studied. For example, ethyl acetate has been useful as a solvent in the polymerization reaction. In the production from a monomer low in solubility, however, there has been the problem that the reaction concentration is lowered and the polymerization time is prolonged. In contrast, it has been found that dimethylene glycol (DMG) is higher in solubility than ethyl acetate, and that the use of DMG can shorten the polymerization time.

It should also be noted that, in the production of conventional polymer couplers, to separate the copolymer coupler after the polymerization reaction, a large amount of water is needed for the reprecipitation. That, however, involves a problem of waste liquid or the like in the reprecipitation using a large amount of water, a problem of the load of drying the copolymer coupler, a problem that production facilities cannot be used easily in common, and a problem of the cost. Therefore the reprecipitation step is a step to be avoided if possible. As an alternative method thereto, a flash vacuum dry system (hereinafter referred to as FVD, in some cases) is proposed (e.g. JP-A-2-191501). In this system, a solution containing the substance to be dried is heated and concentrated in a long pipe-type steam heating pipe, to be formed into a solid/gas mixture of a powdery dried substance and a gas, and then, the solid/gas mixture is spouted into an atmosphere having a reduced pressure, to separate the powdery dried substance from the gas, to obtain the powdery dried substance. In this system, however, if an ether-series solvent, such as DMG, is used, a risk that the formation of a peroxide in the processing by the FVD will lead to inflammation (self-ignition) or the like is feared, and there arises a problem that the spray nozzle at the time of processing (concentrating) by the FVD is clogged.

SUMMARY OF THE INVENTION

Therefore, an object of the present invention is to provide a production method that can give a copolymer high in solubility and suitable for FVD processing, and the method is excellent from the standpoint of the production capacity and stable/safe production throughout the process.

Further, another object of the present invention is to provide a production method capable of giving a photographic copolymer coupler that is excellent in photographic performance. In particular, still another object of the present invention is to provide a method for producing a copolymer coupler that makes it possible to form an image excellent in gradation, antifogging, etc., in color photographic light-sensitive materials.

Other and further objects, features, and advantages of the invention will appear more fully from the following description, taken in connection with the accompanying drawing.

BRIEF DESCRIPTION OF THE DRAWING

FIG. 1 is a graph showing the relationship between the added amount and the adding time of the monomer coupler by dropping in the synthesis of the polymer coupler that was carried out in accordance with the process of an Example of the present invention.

DETAILED DESCRIPTION OF THE INVENTION

The above objects of the present invention have been attained by the following methods:

(1) A method of producing a copolymer by polymerizing at least two monomers having different reactivity as constitutional components, comprising carrying out a polymerization while adding a monomer component B having high reactivity, to a solution of a monomer component A having low reactivity dissolved in a non-aqueous solvent having a boiling point of 55° C. to 120° C., in the presence of a polymerization initiator.

(2) A method of producing a copolymer by polymerizing at least two monomers having different reactivity as constitutional components, comprising carrying out a polymerization while adding, to a solution of a part of a monomer component A having low reactivity dissolved in a non-aqueous solvent having a boiling point of 55° C. to 120° C., a solution of the rest of the monomer component A having low reactivity and a monomer component B having high reactivity, in the presence of a polymerization initiator.

(3) A method of producing a photographic copolymer coupler having at least two monomers as constitutional components: a monomer component A and a monomer component B, comprising carrying out a polymerization while adding, dropwise, a solution of the monomer component B dissolved in a non-aqueous solvent having a boiling point of 55° C. to 120° C., to a solution of the monomer component A dissolved in a non-aqueous solvent having a boiling point of 55° C. to 120° C., in the presence of a polymerization initiator.

(4) The method of producing a copolymer as stated in the above (1), (2), or (3), wherein the polymerization is carried out while adding the polymerization initiator.

(5) The method of producing a copolymer as stated in the above (1), (2), (3), or (4), wherein the addition of the monomer solutions are carried out continuously or intermittently, to carry out the polymerization.

(6) The method of producing a copolymer as stated in the above (1), (2), (3), (4), or (5), further comprising carrying out a separation of the obtained copolymer, wherein the copolymer is separated as a solid with a flash vacuum dry system.

Hereinbelow, the present invention is described in detail.

In the present invention, as constitutional components, at least two types of monomers different in reactivity are copolymerized. In the present invention, the reactivity of monomers is defined by the value r of the monomer reactivity ratio (MRR), calculated by the Fineman method, and the difference Δr between the r values of the reactivity of at least two monomers is preferably from 0.2 to 4, and more preferably from 0.2 to 1.2. In this case, the relative reactivity between monomers determines which monomer becomes the monomer component A or the monomer component B.

The monomer components used in the present invention are not particularly restricted, and examples of the monomer components higher in reactivity can be mentioned below, in order of decreasing reactivity.

Styrene-series monomers≧methacrylic acid ester-series monomers≧methacrylamide-series monomers≧acrylamide-series monomers≧acryloyl-series monomers=≧acrylic-series monomers Herein, the monomer reactivity ratio can be measured according to the method described in the following examples. Details are described in "Polymer Handbook (Second Edition)," II-105 to II-386 (written by J. Brandrup, E. H. Immergutt), and documents cited therein.

The method of the present invention is a method suitable for producing a copolymer, and in particular it is a method suitable for producing a polymer used in silver halide photographic light-sensitive materials. Examples of the polymer include polymer couplers, acid polymers, antifading agent polymers, and polymers for dispersion.

Hereinbelow, the method of the present invention is described mainly by reference to cases wherein the method is applied to the production of photographic copolymer couplers.

The monomer component A and the monomer component B for copolymerization can each be, for example, a monomer that can introduce a unit for inducing a coupling reaction with an oxidation product of a color-developing agent in a photographic copolymer coupler, i.e. a monomer coupler, or they can each be a monomer having no part for inducing a coupling reaction with an oxidation product of a color-developing agent, i.e. a non-color-forming monomer. As the monomer component A, a non-color-forming monomer is preferable, and as the monomer component B to be added to the monomer component A, a monomer coupler is preferable.

The monomer coupler is not particularly restricted, and ester-series monomer couplers and amide-series monomer couplers derived from acrylic acids, such as acrylic acid, α-chloroacrylic acid, and methacrylic acid, are preferable, with particular preference given to acrylamide-series monomer couplers and methacrylamide-series monomer couplers, and more particular preference given to acrylamido-5-pyrazolones and methacrylamido-5-pyrazolones. Specifically, for example, a monomer represented by formula (I) of JP-A-57-94752, a monomer represented by formula (I) of JP-A-58-224352, a monomer represented by formula (I) of JP-A-58-28745, and a monomer represented by formula (a) of US-A-3 356 686 can be mentioned. Specific examples include monomers described therein and monomers described in JP-A-2-191501.

Examples of the monomer couplers include magenta monomer couplers, cyan monomer couplers, and yellow monomer couplers. Acrylamido- or methacrylamido-5-pyrazolones as the magenta monomer couplers are, for example, those represented by the following formula (I):

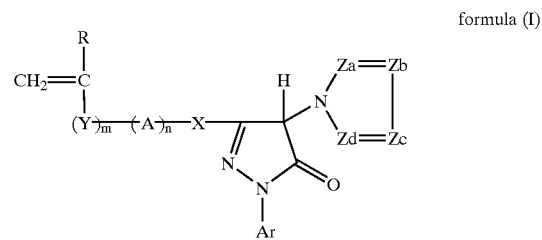

formula (I)

wherein R represents a hydrogen atom, a lower alkyl group having 1 to 4 carbon atoms, or a chlorine atom; X represents —CONH—, —NH—, —NHCONH—, or —NHCOO—; Y represents —CONH— or —COO—; A represents an unsubstituted or substituted straight-chain or branched alkylene group, or an unsubstituted or substituted phenylene group; Ar represents an unsubstituted or substituted phenyl group; Za, Zb, Zc, and Zd each represent methine, substituted methine, or —N═; and m and n are each 0 or 1.

Further, as yellow monomer couplers and cyan monomer couplers, for example, couplers described in JP-A-9-204026 can be mentioned, and these are represented by the following formula (II) or (III):

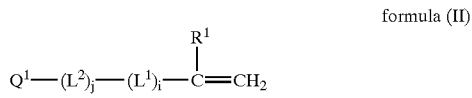

formula (II)

wherein $R^1$ represents a hydrogen atom, a chlorine atom, an alkyl group, or aryl group; $L^1$ represents —C(═O)N($R^2$)—, —C(═O)O—, —N($R^2$)C(═O)—, —OC(═O)—, formula (IV), formula (V), or formula (VI), shown below, in which $R^2$ represents a hydrogen atom, an alkyl group, an aryl group, or a heterocyclic group; $L^2$ represents a divalent linking group to link $L^1$ and $Q^1$, i is 0 or 1, j is 0 or 1, and $Q^1$ represents a yellow coupler residue capable of forming a yellow dye upon coupling with an oxidation product of an aromatic primary amine developing agent.

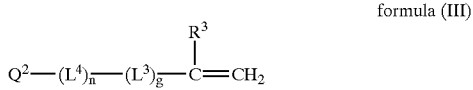

formula (III)

wherein $R^3$ has the same meaning as $R^1$, $L^3$ has the same meaning as $L^1$, $L^4$ has the same meaning as $L^2$, g has the same meaning as i, h has the same meaning as j, and $Q^2$ represents a cyan coupler residue capable of forming a cyan dye upon coupling with an oxidation product of an aromatic primary amine developing agent.

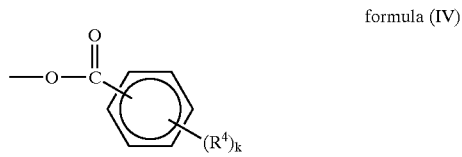

formula (IV)

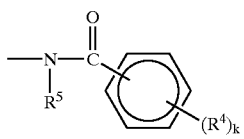
formula (V)
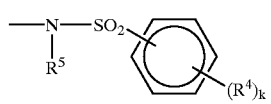
formula (VI)
wherein $R^4$ represents a substituent, $R^5$ has the same meaning as $R^2$, and k represents an integer of 0 to 4.
Exemplified compounds of the compound represented by formula (I), (II), or (III) include the following.
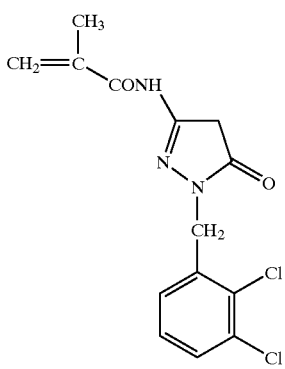
(M-1)
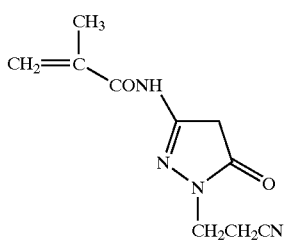
(M-2)
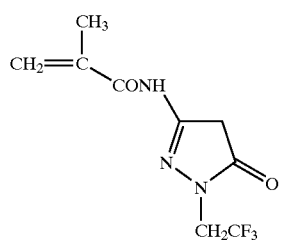
(M-3)
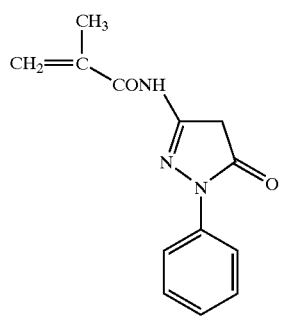
(M-4)
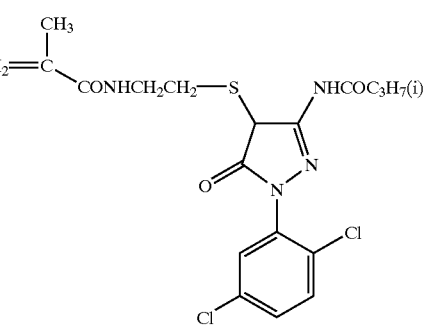
(M-5)
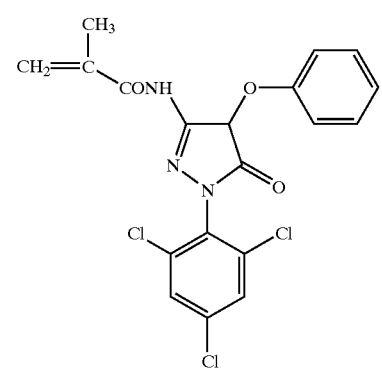
(M-6)
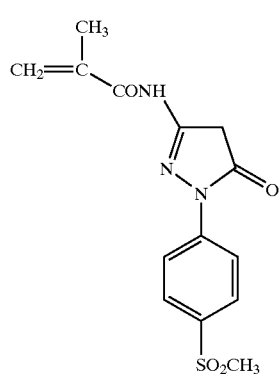
(M-7)
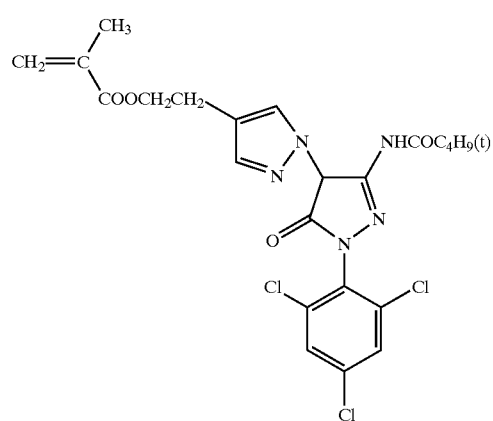
(M-8)

-continued
(M-9)
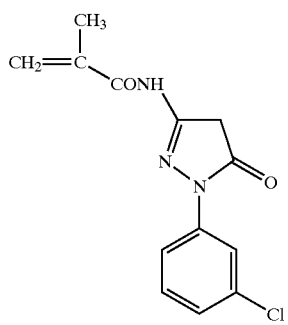
(M-10)
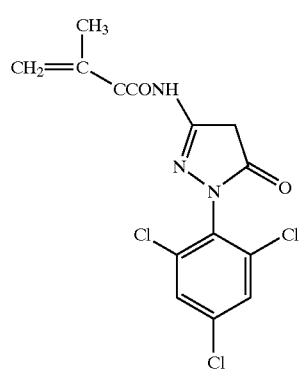
(M-11)
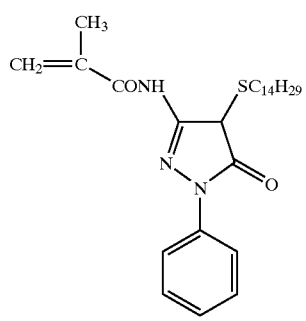
(M-12)
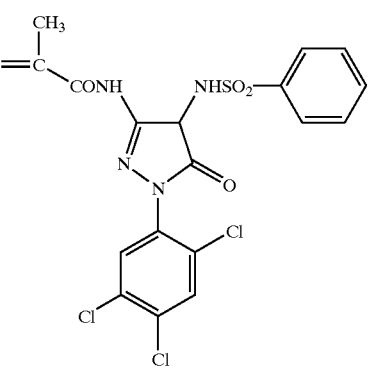
-continued
(M-13)
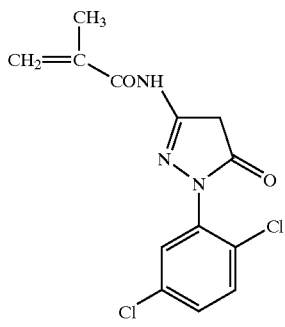
(M-14)
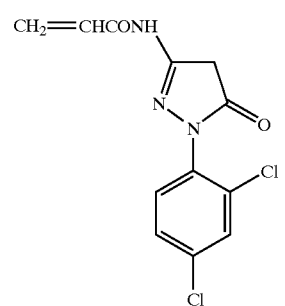
(M-15)
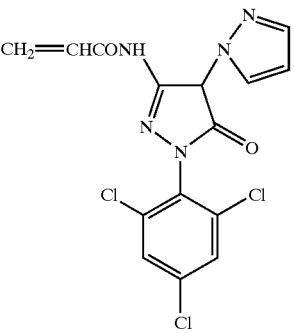
(M-16)
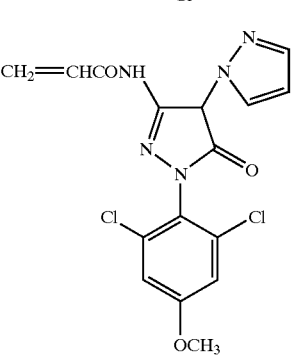
(M-17)
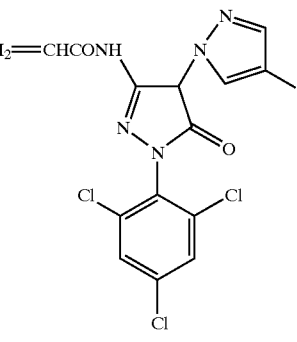

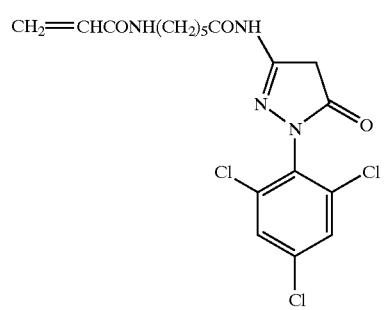 (M-18)
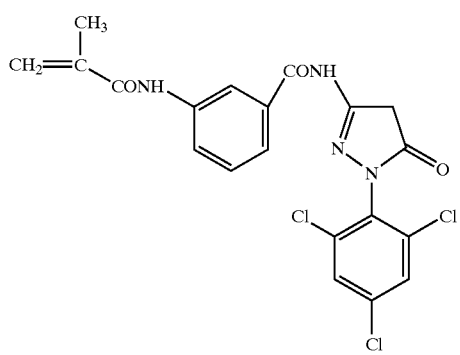 (M-22)
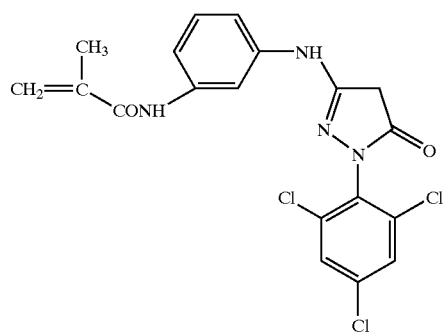 (M-19)
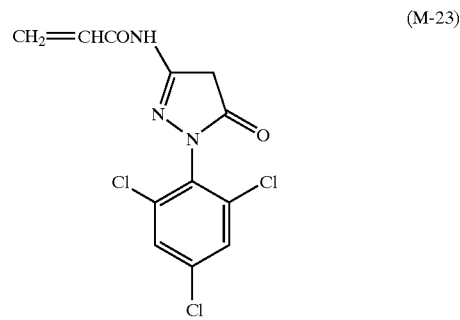 (M-23)
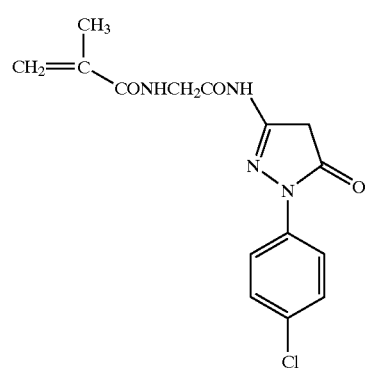 (M-20)
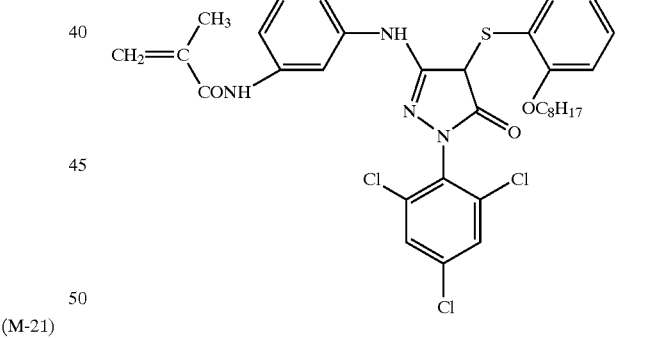 (M-24)
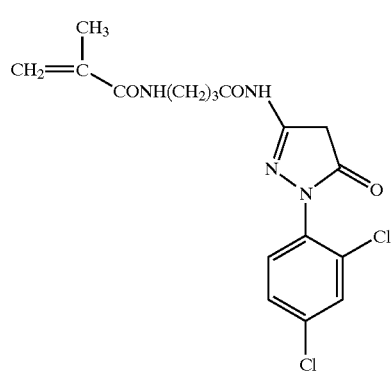 (M-21)
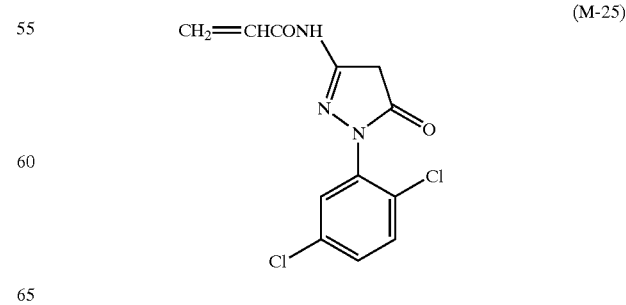 (M-25)

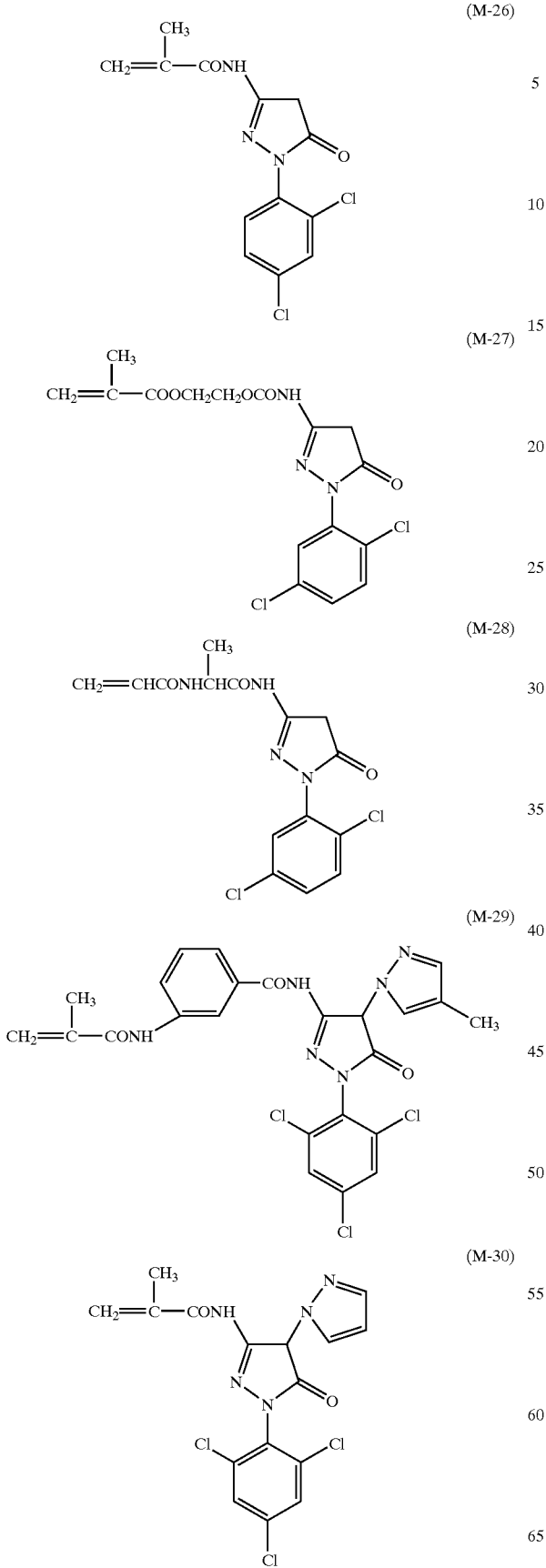
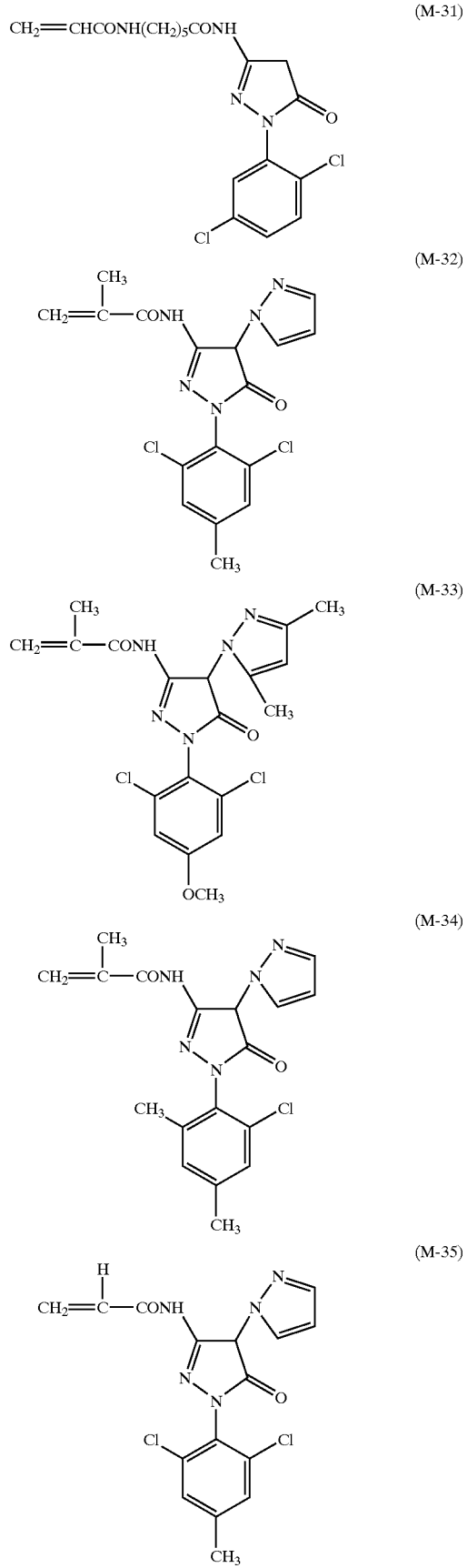

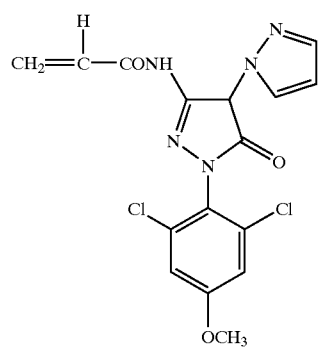
(M-36)
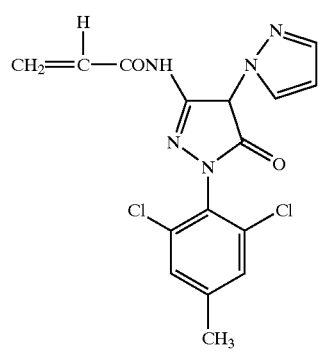
(M-37)
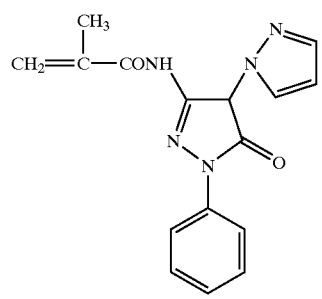
(M-38)
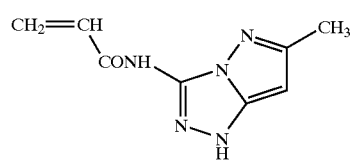
(M-39)
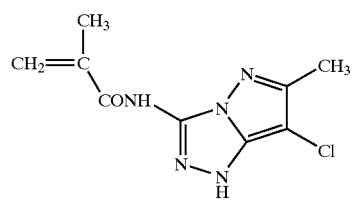
(M-40)
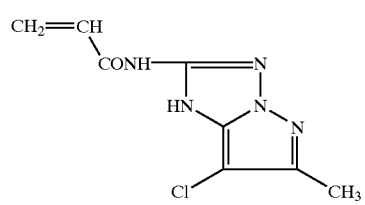
(M-41)
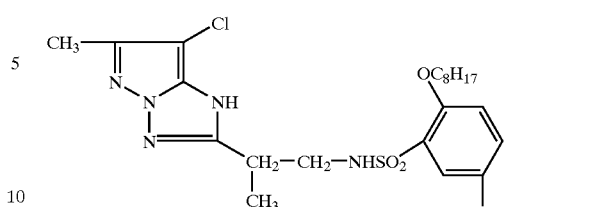
(M-42)
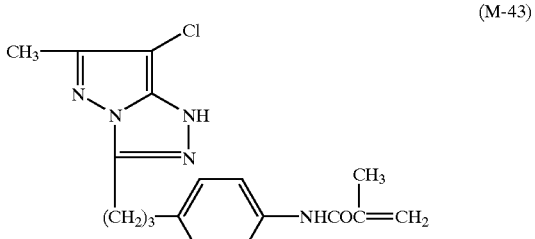
(M-43)
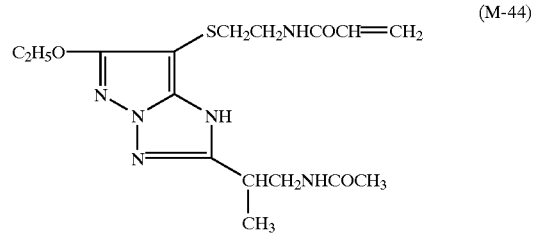
(M-44)
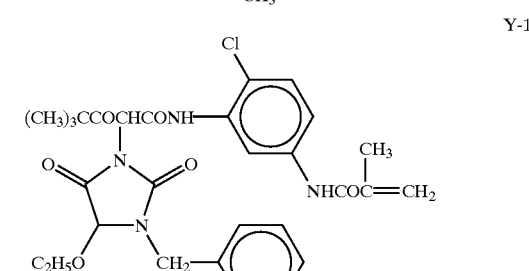
Y-1
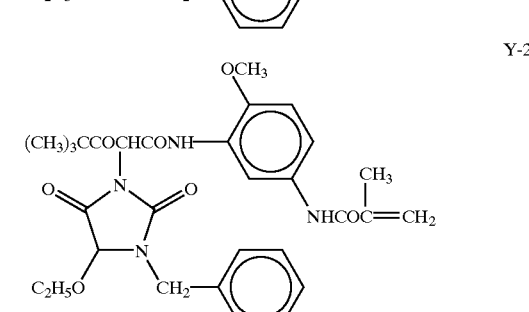
Y-2
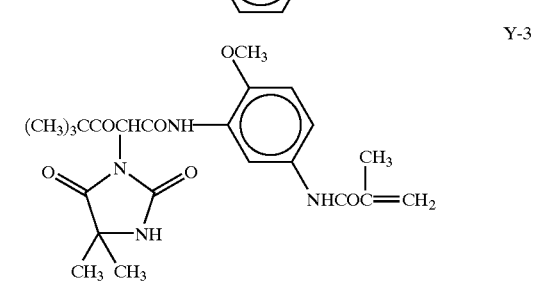
Y-3

-continued
Y-4
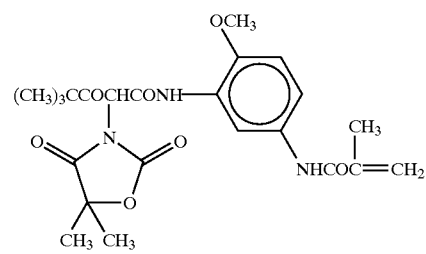
Y-5
Y-6
Y-7
Y-8
Y-9
-continued
Y-10
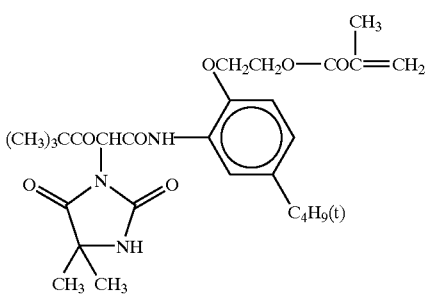
C-1
C-2
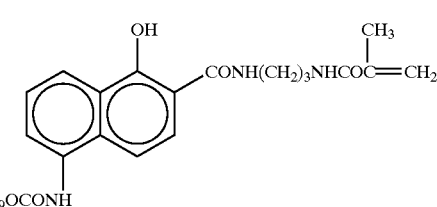
C-3
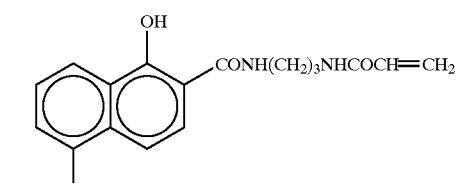
C-4
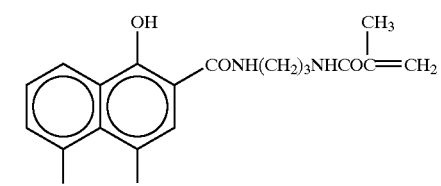
C-5
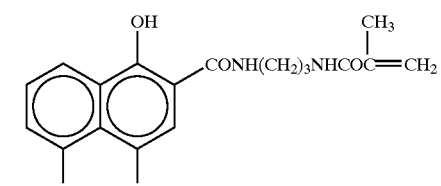
C-6
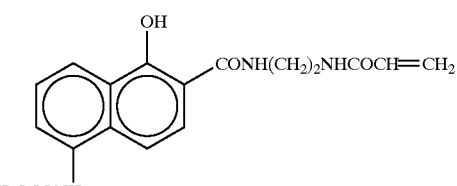
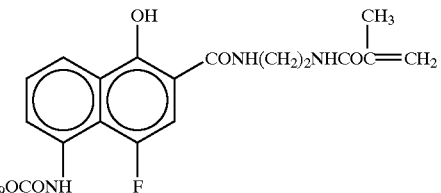

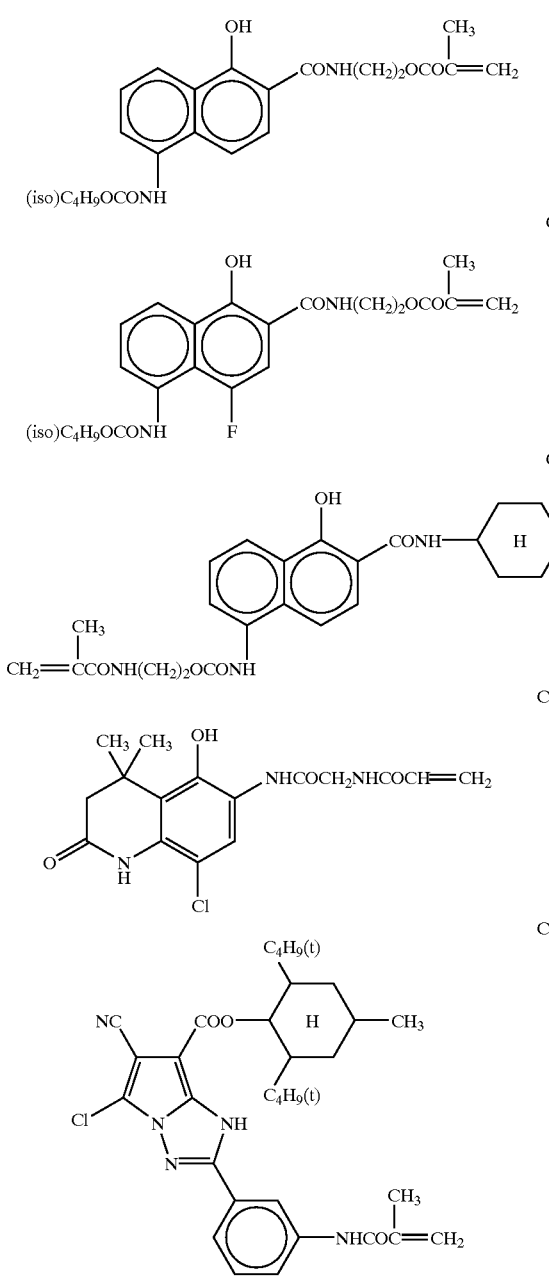

Examples of the non-color-forming monomer, i.e. the monomer that does not undergo a coupling reaction with an oxidation product of a color-developing agent, include esters derived from acrylic acids, such as acrylic acid, α-chloroacrylic acid, and methacrylic acid (e.g. methyl acrylate, methyl methacrylate, ethyl acrylate, n-propyl acrylate, n-butyl acrylate, and 2-ethylhexyl acrylate); amides (e.g. acrylamide, methacrylamide, and t-butyl acrylamide), vinyl esters (e.g. vinyl acetate), acrylonitrile, methacrylonitrile, aromatic vinyl compounds (e.g. styrene, vinyltoluene, divinylbenzene, and sulfostyrene), itaconic acid, vinyl alkyl ethers (e.g. vinyl ethyl ether), and maleic acid esters, but the non-color-forming monomer is not restricted to them. Those described, for example, in JP-A-57-94752, JP-A-58-224352, JP-A-58-28745, and U.S. Pat. No. 3,356,686 may be used.

These non-color-forming monomers may be used alone or as a combination of two or more; for example, a combination of n-butyl acrylate and divinylbenzene, a combination of styrene and methacrylic acid, and a combination of n-butyl acrylate and methacrylic acid.

As monomers used in the production of copolymers other than polymer couplers, can be mentioned styrene-series monomers, methacrylic acid ester-series monomers, methacrylonitrile-series monomers, methacrylamide-series monomers, acrylamide-series monomers, acrylonitrile-series monomers, and acrylic acid ester-series monomers.

The values of the reactivity of the monomers used in the present invention can be found easily by the above-described method, and they are also described in "Polymer Handbook (2nd Ed.)" supra.

Examples of the non-aqueous solvent having a boiling point of 55° C. to 120° C. used in the present invention, include alcohols (e.g. n-butanol, ethanol, iso-propanol, and n-propanol), ketones (e.g. methylethylketone), esters (e.g. ethyl acetate), toluene, acetonitrile, and dioxane, and among them, one having a boiling point of 68° C. to 85° C. is preferable, one having a boiling point of 70° C. to 80° C. is more preferable, and ethyl acetate is particularly preferable.

Into the non-aqueous solvent, water may be mixed to such an extent that the solvent is approximately saturated with water (in an amount of about 3.3% by weight), to increase the solubility of the monomer. This is particularly effective when a coupler monomer is dissolved.

In the present invention, each of the monomer components is preferably used in a concentration of 5 to 50% by weight, and more preferably 15 to 25% by weight, to the non-aqueous solvent.

As the polymerization initiator, can be used one usually used as a catalyst for polymerization, and examples include persulfates, such as ammonium persulfate and potassium persulfate; azonitriles, such as 4,4'-azo-bis(4-cyano-valerianic acid), 2,2'-azobisisobutyronitrile, dimethyl-2,2'-azobisisobutyrate, 2,2'-azobis(4-methoxy-2,4-dimethylvaleronitrile), 2,2'-azobis(2-cyclopropylpropionnitrile), 2,2'-azobis(2,4-dimethylvaleronitrile), 2,2'-azobis(2-methylbutyronitrile), 1,1'-azobis(cyclohexane-1-carbonitrile), 1-[(1-cyano-1-methylethyl)azo]formamido(2-(carbamoylazo)isobutyronitrile), 2-phenylazo-4-methoxy-2,4-dimethyl-valeronitrile, and 2,2'-azobis[2-(hydroxymethyl)propionitrile]; and peroxides, such as benzoyl peroxide and hydrogen peroxide, with preference given to azonitriles.

The polymerization initiator may be added with the monomer components, which are dissolved together, or it may be added, dropwise, as a solution dissolved in a non-aqueous solvent (e.g. ethyl acetate). Preferably the polymerization initiator is added, dropwise, as an ethyl acetate solution, while carrying out the polymerization. The polymerization initiator may be further added after the polymerization (i.e. it may be post-added).

Preferably the amount of the polymerization initiator to be added is 1 to 10% by weight, and more preferably 3 to 7% by weight, to the monomer components.

The temperature of the solution of the monomer component B is preferably elevated to about 40 to 60° C. when it is added, so that the solubility may be increased. When the monomer component B or a solution containing it is added, it may be dissolved in a solution of the above-mentioned non-aqueous solvent having a boiling point of 55° C. to 120° C., and the resulting solution may be added.

In the method of the present invention, polymerization is carried out while the monomer component B is added. The addition of the monomer component B is carried out either continuously or intermittently in portions. As a typical mode of the addition, the monomer component B is added dropewise. If the polymerization is carried out by adding the monomer component B in one portion all at once, the polymerization reaction of the monomer component A proceeds little, and the solubility of the produced polymer in ethyl acetate is very poor.

In the present invention, the term "adding continuously or intermittently" means that preferably 40% or more, more preferably 50% or more, and particularly preferably 60% or more, of the monomer component B is added continuously or intermittently.

In adding the monomer component B dropwise to the monomer component A, preferably the monomer components are heated to the polymerization reaction temperature. The polymerization reaction may be carried out at the reflux temperature of the non-aqueous solvent, and preferably the internal temperature is 65 to 110° C., more preferably 68 to 85° C., and further preferably 70 to 80° C.

Whereas, in the conventional method, the rate of stirring, the reaction temperature, and the scale-up effect greatly affect the polymerization rate and the physical properties of the copolymer, in the method of the present invention, by controlling the addition of the monomers and the initiator by dropping, the polymerization rate (the polymerization ratio) can be controlled and the polymerization reaction can be carried out stably and quantitatively.

Particularly, in the case of the production of a photographic copolymer, the photographic performance of the obtained photographic copolymer, and in particular the gradation of the photographic image of the light-sensitive material.wherein the obtained copolymer is used, are greatly influenced by the adding time and the adding speed (rate) by dropping. The method of the present invention is advantageous in that the adding time, the adding speed, by dropping, and the like can be suitably set to meet the desired performance.

Generally, the weight-average molecular weight of the copolymer obtained by the method of the present invention is 6,000 to 200,000, preferably 10,000 to 150,000, and more preferably 10,000 to 120,000.

In the method of the present.invention, when a monomer B (e.g. a coupler monomer) is reacted with a monomer A (e.g. several kinds of non-color-forming monomers such as styrene and n-butyl acrylate), the monomer B and the monomer A to be added may be added separately, or one of them may be added all at once. Preferably, the solutions of them are separately added. The addition may be carried out in two steps.

The time required for the addition in the method of the present invention can be selected varyingly depending on the type of the monomer B (e.g. a coupler monomer) and the monomer A (e.g. a non-color-forming monomer). For photographic couplers, the ratio of the components is preferably adjusted to obtain excellent photographic performance, and in order to adjust the ratio of the components suited to such required performance, it is necessary to determine the time required for the addition. In the concrete, the setting of the adding time by dropping is made by determining conditions under which the adding speed and the adding time by dropping of each of the monomer components and the polymerization initiator are optimized to obtain a preferable composition distribution of the obtained polymer, i.e. a preferable copolymerization composition distribution of the coupler monomer and the non-color-forming monomer, to optimize the photographic performance (particularly the gradation) of the copolymer, especially, the polymer coupler.

The adding time of the monomer B is varied depending on conditions, including the output, the reaction temperature, etc., and it is preferably 120 to 400 min, more preferably 240 to 300 min, and particularly preferably 260 to 280 min, overall. In order to carry out the production stably, preferably the adding time is controlled to be within the above range, with an error ranging from −8 to +8% and more preferably from −3 to +3%, to the prescribed time.

In the case of the addition of the third monomer component, for example, in the case of the addition of styrene, preferably the adding time is 120 to 300 min, more preferably 180 to 240 min, and particularly preferably 190 to 230 min, overall. In order to carry out the production stably, preferably the adding time is controlled to be within the above range, with an error ranging from −10 to +10% and more preferably from −5 to +5%, to the prescribed time.

The adding speed of the polymerization initiator is such that adding is completed within preferably 120 to 500 min, more preferably 400 to 490 min, and particularly preferably 430 to 470 min, overall. In order to carry out the production stably, preferably the adding time is controlled to be within the above range, with an error ranging from −7 to +7% and more preferably from −3 to +3%, to the prescribed time.

The total time of the polymerization reaction may vary depending on the production conditions, including the output, the reaction temperature, etc., and it is generally 240 to 2,100 min, and preferably 240 to 1,200 min.

In the method of the present invention, after the conclusion of the polymerization reaction, the reaction liquid can be dried by the drying method under reduced pressure, to separate and recover the intended copolymer (e.g. a polymer coupler).

In the flash vacuum dry system (FVD), the resulting solution of the substance to be dried after the conclusion of the reaction is heated and concentrated (at a temperature higher than the boiling point of the solvent, i.e. at about 98° C.) in a long pipe-type steam superheating pipe (e.g. a double pipe described in the registered Japanese Utility Model No. 1222088), to be formed into a solid/gas mixture of a powdery substance to be dried and a gas, and the solid/gas mixture is spouted into an atmosphere having a reduced pressure (into a vacuum container), to separate the powdery dried substance from the gas. In more detail, it can be carried out in accordance with a method described in JP-A-2-191501 and the like.

The FVD in the present invention is desirably carried out such that the viscosity of the reaction liquid obtained in the above polymerization reaction is adjusted generally to 1 to 50 cps, and preferably to 1 to 20 cps, with a suitable solvent.

Although the above description is directed mainly to the case wherein the copolymer is a photographic copolymer, the above description also applies to cases of other copolymers.

The copolymer obtained by the method of the present invention can be used, for example, as various coloring materials and additives for silver halide photographic light-sensitive materials.

Silver halide photographic light-sensitive materials, the production thereof, additives thereof, methods for subjecting them to development, etc., are described in detail in Research Disclosure Vol. 176, RD-17643 (1978) and ibid. RD-40145 (1997).

A typical example of silver halide color photographic light-sensitive materials is provided hydrophilic colloid layers, such as intermediate layers and silver halide emulsion layers, on a base, and the emulsion layers are made up of silver halide grains, couplers, gelatin, etc.

The method of the present invention is preferable for the stable/safe production of a copolymerization polymer having the desired characteristics, and according to the method of the present invention, a polymer given the required performance (for example, in photographic polymer couplers, gradation and antifogging) can be produced only by adjusting the added amount and the adding time by dropping. In particular, the production method of the present invention brings about excellent effects/actions that can provide a polymer that is excellent in quality and can give the desired photographic performance, easily, stably, and in a safe manner. Further, according to the method of the present invention, many various products can be easily produced by a single apparatus.

Hereinbelow, the present invention will be described in more detail referring to the following Examples.

EXAMPLES

Example 1

The polymerization reaction of Polymer coupler A that would be proceeded according to the following reaction scheme (1) was carried out by the production method described below.

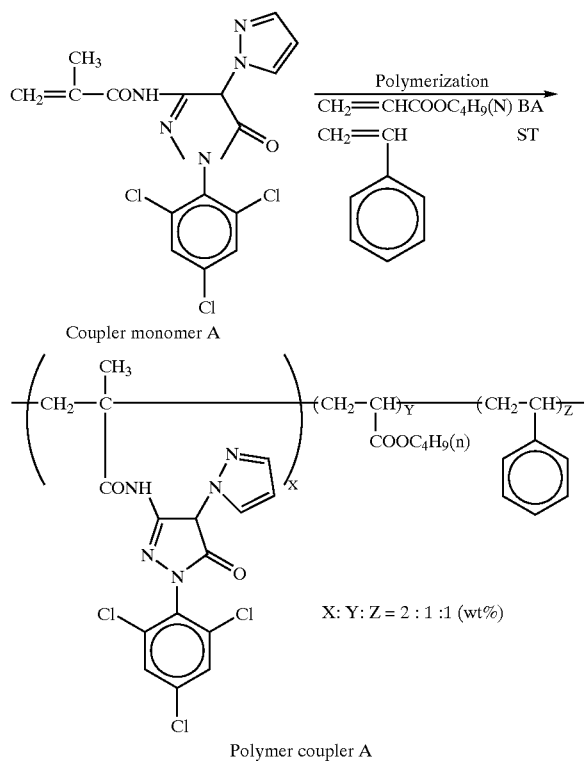

1338 ml of ethyl acetate, 40 ml of distilled water, 36 mg of p-methoxyphenol, and 180 g of Coupler monomer A were charged into a three-necked flask having a volume of 2 liters and equipped with a reflux condenser, a thermometer, and stirring blades; the temperature was elevated to 58° C., and they were stirred to prepare a solution, which resulting solution was named Solution A.

Separately, 56 ml of ethyl acetate and 25.2 g of dimethyl-2,2'-azobisisobutyrate (hereinafter referred to as Initiator V) were charged into a 200-ml beaker and stirred to dissolve the Initiator V, which resulting solution was named Solution B.

Separately, 90 g of styrene was put into a 200-ml beaker, which was named Solution C.

On the other hand, 162 ml of ethyl acetate and 90 g of butyl acrylate were charged into a four-necked flask having a volume of 2 liters and equipped with a reflux condenser, a thermometer, a nitrogen introduction tube, and stirring blades, and the temperature was elevated to 78° C. The above Solution A, Solution B and Solution C were introduced dropwise into this reaction flask, simultaneously, under the following conditions:

Solution A: 50% of all the volume was introduced dropwise over 90 min, and the rest, another 50% of all the volume, was introduced dropwise over 180 min;

Solution B: 29.6% of all the volume was introduced dropwise over 60 min; then 44.4% of all the volume was introduced dropwise over 180 min, and the rest, 26% of all the volume, was introduced dropwise over 210 min; and Solution C: all the volume was introduced dropwise over 210 min.

After the completion of the dropping of Solution B, the reaction was continued for a further 120 min, followed by allowing it to stand overnight at 60° C. The next day, the reaction flask was heated to 73° C.; then 40% of all the volume of Solution D, which had been prepared by dissolving 7.2 g of Initiator V in 27 ml of ethyl acetate taken in a 50-ml beaker, was introduced dropwise into the reaction flask over 30 min, and 60% of all the volume of Solution D was introduced dropwise into the reaction flask over 180 min. After the completion of the dropping, the reaction was continued for a further 360 min, and then the reaction liquid was cooled to a temperature of 30° C.

150 ml of ethyl acetate was added to this reaction liquid, so that the polymer coupler would be diluted to have a concentration of 20% by weight, to obtain a homogeneous solution. The viscosity of the solution was 3 cps (centipoises) (measured at 25° C. by Brookfield viscosimeter).

The above diluted solution was supplied, quantitatively at 100 ml/min using a steady flow pump, into a long pipe-type steam heating pipe, through which reduced-pressure steam having a temperature of 98° C. was passed by a reduced-pressure steam generating apparatus, and then the solution was spouted into a vacuum container. Previously, the pressure in the vacuum container was kept at 20 to 40 Torr by a vacuum generating apparatus, and warm water at 40° C. was circulated through the jacket of the vacuum container, so that vapor of solvents might not be condensed. From the other end of the heating pipe, the above solution supplied quantitatively was spouted continuously as a powdery solid/gas mixture. When the solution was depleted, 500 ml of ethyl acetate was fed into the long pipe-type steam heating pipe under the same conditions as above, to discharge the liquid in the pipe using the vapor of the ethyl acetate. (This process is abbreviated to the FVD process hereinafter.) After 30 min, the pressure in the vacuum container was brought to atmospheric pressure, and 369.4 g (yield: 95%) of a powdery Polymer coupler A was taken out, which was obtained in the form of a powdery dried product containing 2.0 wt % of volatile components. The weight-average molecular weight measured by GPC was 15,000, and the viscosity ($\eta$=SP/C) was 0.07. (Parenthetically, the FVD process was carried out using the apparatus shown in FIG. 1 of JP-A-2-191501, in the same manner as the method of Example 1 of JP-A-2-191501, except for the matters shown above.)

The reactivity ratio of the monomers used herein is as follows:

TABLE 1

| Solvent: Ethyl acetate Temperature: 60° C. | | | | | |
|---|---|---|---|---|---|
| Coupler monomer A/ BA (butyl acrylate) | | Coupler monomer A/ St (styrene) | | BA/St | |
| $r_1$ | $r_2$ | $r_1$ | $r_2$ | $r_1$ | $r_2$ |
| 3.34 | 0.26 | 0.16 | 0.18 | 0.18 | 0.85 |

Method of measurement: Coupler monomer A and Coupler monomer B (BA) were polymerized by using a polymerization initiator, dimethyl-2,2'-azobisisobutyrate, in a solvent ethyl acetate; and then, the resulting polymer was precipitated and separated using a solvent hexane. After elemental analysis of a sample thereof was carried out, and several experiments for finding the copolymerization composition ratio based on the nitrogen content were carried out, the monomer reactivity (ratio) was calculated by the Fineman method (see, Yoshihiko Kubouchi, "Kobunshi Jikkengaku-koza", Vol. 10, page 119 (1958), published by Kyoritsu-Shuppan KK.)

Example 2

The polymerization reaction of Polymer coupler B that would be proceeded according to the following reaction scheme (2) was carried out by the production method described below.

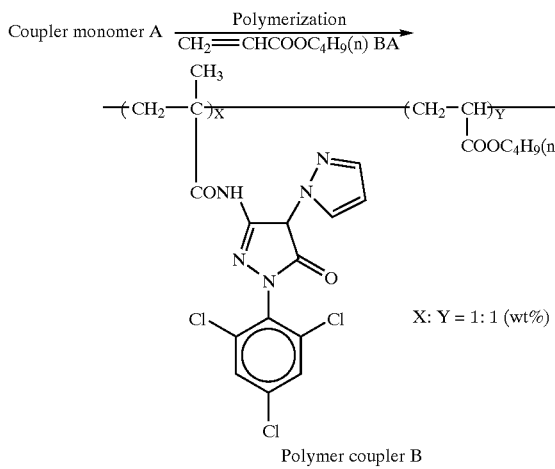

2412 ml of ethyl acetate, 69 ml of distilled water, 36 mg of p-methoxyphenol, and 180 g of Coupler monomer A were charged into a three-necked flask having a volume of 3 liters and equipped with a reflux condenser, a thermometer, and stirring blades; the temperature was elevated to 40° C., and they were stirred to prepare a solution, which resulting solution was named Solution A.

Separately, 56 ml of ethyl acetate and 14.4 g of Initiator V were charged into a 200-ml beaker and stirred to dissolve the Initiator V, which resulting solution was named Solution B.

On the other hand, 162 ml of ethyl acetate and 180 g of butyl acrylate were charged into a four-necked flask having a volume of 3 liters and equipped with a reflux condenser, a thermometer, a nitrogen introduction tube, and stirring blades, and the temperature was elevated to 78° C. The above Solution A and Solution B were introduced dropwise into this reaction flask, simultaneously, under the following conditions:

Solution A: 80% of all the volume was introduced dropwise over 120 min, and the rest, 20% of all the volume, was introduced dropwise over 120 min;

Solution B: 80% of all the volume was introduced dropwise over 120 min, and the rest, 20% of all the volume, was introduced dropwise over 120 min.

After the completion of the dropping of Solution A and Solution B, the reaction was continued for a further 180 min, and then the reaction liquid was cooled to a temperature of 30° C. 1090 ml of ethyl acetate was added to this reaction liquid, so that the polymer coupler would be diluted to have a concentration of 10% by weight, to obtain a homogeneous solution. The viscosity of the solution was 3 cps (centipoises) (measured at 25° C. by Brookfield viscosimeter).

To this solution, the FVD process was carried out in the same manner as Example 1, to obtain Polymer coupler B of 355.8 g (yield: 95.0%), which was in the form of a powdery dried product containing 2.5 wt % of volatile components. The weight-average molecular weight measured by GPC was 20,000, and the viscosity ($\eta$=SP/C) was 0.077.

The reactivity ratio of the monomers used herein was the same as those shown in Example 1.

Example 3

The polymerization reaction of Polymer coupler C that would be proceeded according to the following reaction scheme (3) was carried out by the production method described below.

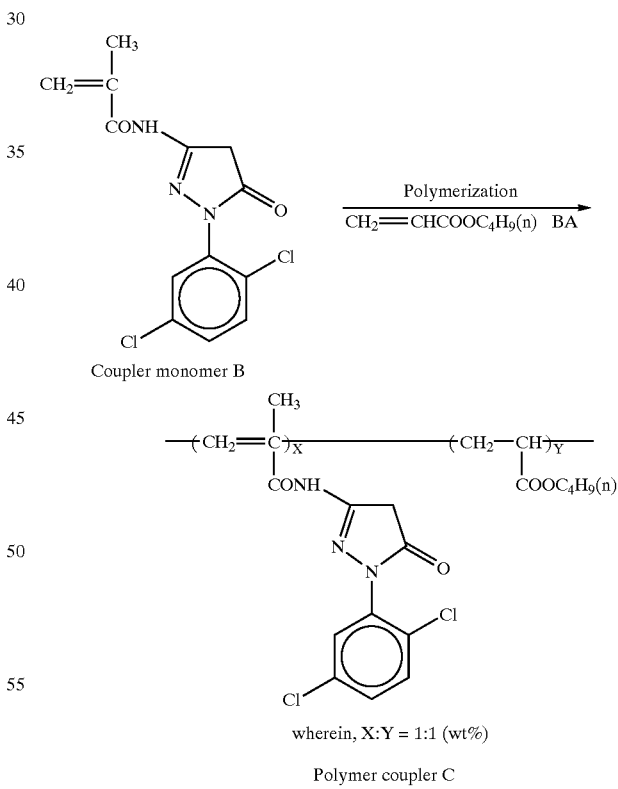

438 ml of ethyl acetate, 13 ml of distilled water, 20 mg-of p-methoxyphenol, and 100 g of Coupler monomer B were charged into a three-necked flask having a volume of 1 liter and equipped with a reflux condenser, a thermometer, and stirring blades; the temperature was elevated to 40° C., and they were stirred to prepare a solution, which resulting solution was named Solution A.

Separately, 28 ml of ethyl acetate and 7.3 g of Initiator V were charged into a 200-ml beaker and stirred to dissolve the Initiator V, which resulting solution was named Solution B.

On the other hand, 100 ml of ethyl acetate and 100 g of butyl acrylate were charged into a four-necked flask having a volume of 3 liters and equipped with a reflux condenser, a thermometer, a nitrogen introduction tube, and stirring blades, and the temperature was elevated to 78° C. The above Solution A and Solution B were introduced dropwise into this reaction flask, simultaneously, under the following conditions:

Solution A: 80% of all the volume was introduced dropwise over 120 min, and the rest, 20% of all the volume, was introduced dropwise over 120 min;

Solution B: 80% of all the volume was introduced dropwise over 120 min, and the rest, 20% of all the volume, was introduced dropwise over 120 min.

After the completion of the dropping of Solution A and Solution B, the reaction was continued for a further 180 min, and then the reaction liquid was cooled to a temperature of 30° C. 1113 ml of ethyl acetate was added to this reaction liquid, so that the polymer coupler would be diluted to have a concentration of 12% by weight, to obtain a homogeneous solution. The viscosity of the solution was 2 cps (centipoises) (measured at 25° C. by Brookfield viscosimeter).

To this solution, the FVD process was carried out in the same manner as Example 1, to obtain Polymer coupler C of 190 g (yield:92%), which was in the form of a powdery dry product containing 2.0 wt % of volatile components. The weight-average molecular weight measured by GPC was 115,000, and the viscosity (η=SP/C) was 0.30.

Example 4

Influence Test on Photographic Properties

Polymer couplers (I) to (IV) were produced in the same manner as the production of Polymer coupler A in Example 1, except that the dropped amount and the dropping time of the monomer coupler were changed as shown in FIG. 1.

With respect to the influence on the photographic performance when the dropped amount and the dropping time were as shown in FIG. 1, Coupler EX-1 of Sample 101 as described in Example 1 of JP-A-61-23455 was replaced with the above obtained Polymer coupler A, or Polymer coupler (I), (II), (III), or (IV), to test the gradation(γ), respectively. The results are shown in Table 2 below.

TABLE 2

| Coupler | Polymerization formuration (Coupler monomer A contents of modification) | | Gradation |
|---|---|---|---|
| | Coupler monomer A | Dropped amount and dropping time | |
| Polymer coupler A | ½ → 1H | ½ → 3H | 1.58 |
| Polymer coupler (I) | ½ → 1H | ½ → 5H | 1.58 |
| Polymer coupler (II) | ½ → 2H | ½ → 4H | 1.62 |
| Polymer coupler (III) | ½ → 1.5H | ½ → 4.5H | 1.62 |
| Polymer coupler (IV) | ½ → 1.5H | ½ → 3H | 1.55 |

As is apparent from the results shown above, Polymer coupler A, and Polymer couplers (I) and (IV) gave soft gradation, while Polymer couplers (II) and (III) gave photographic images hard in gradation. Thus, it can be understood that, in accordance with the present invention, the photographic properties obtained from the intended polymer couplers can be controlled by adjusting the dropping speeds of the monomer components.

Further, the influence on the photographic properties was investigated using the couplers obtained by the method of the present invention in place of Coupler C-8 of Sample 201 (a color-negative film) described in Example 2 of JP-A-61-232455, and the similar results were obtained.

Example 5

Copolymer D was prepared according to the following reaction scheme.

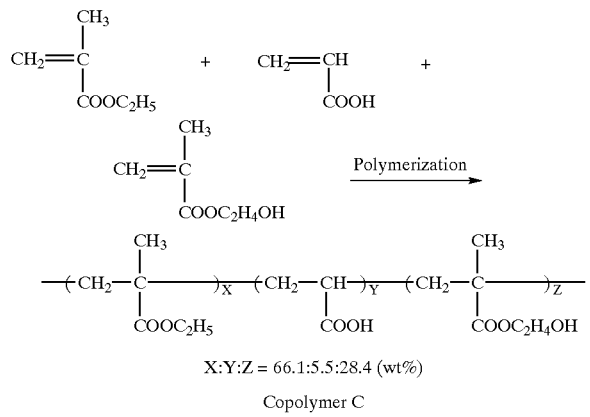

Copolymer C 120 g of 2-butanone, 242 g of ethyl methacrylate, 16 g of acrylic acid, and 104 g of 2-hydroxymethacrylate were charged into a three-necked flask having a volume of 1 liter and equipped with a reflux condenser, a thermometer, and stirring blades; and they were stirred to prepare a solution, which resulting solution was named Solution A. Separately, 56 g of 2-butanone and 10 g of dimethyl-2,2'-azobisisobutyrate (hereafter referred to as Initiator V) were charged into a 200-ml beaker and stirred to dissolve the Initiator V, which resulting solution was named Solution B.

On the other hand, 88 g of 2-butanone and 4 g of acrylic acid were charged into a four-necked flask having a volume of 1 liter and equipped with a reflux condenser, a thermometer, a nitrogen introduction tube, and stirring blades, and the temperature was elevated to 75° C. The above Solution A and Solution B were introduced dropwise into this reaction flask, simultaneously, under the following conditions:

Solution A: 70% of all the volume was introduced dropwise over 120 min, and the rest, 30% of all the volume, was introduced dropwise over 240 min;

Solution B: 70% of all the volume was introduced dropwise over 120 min, and the rest, 30% of all the volume, was introduced dropwise over 240 min.

After the completion of the dropping of Solution A and Solution B, the reaction was continued for a further 120 min, and then the reaction liquid was cooled to a temperature of 30° C. 260 g of 2-butanone was added to this reaction liquid, to dilute and to obtain a homogeneous solution. The viscos ity of the resulting solution was 170 mpas (measured at 25° C. by Brookfield viscosimeter). The weight-average molecular weight of the polymer measured by GPC was 29,000.

The thus-obtained copolymer can be used for photographic additives as a pH-controlling acid polymer.

Example 6

2412 ml of ethyl acetate, 69 ml of distilled water, 36 mg of p-methoxyphenol, 180 g of Coupler monomer A, and 90 g of n-butylacrylate were charged into a three-necked flask having a volume of 3 liters and equipped with a reflux condenser, a thermometer, and stirring blades; the temperature was elevated to 40° C., and they were stirred to prepare a solution, which resulting solution was named Solution A.

Separately, 56 ml of ethyl acetate and 14.4 g of dimethyl-2,2'-azobisisobutyrate (hereafter referred to as V-601) were charged into a 200-ml beaker and stirred to dissolve the V-601, which resulting solution was named Solution B.

On the other hand, 162 ml of ethyl acetate and 90 g of butyl acrylate were charged into a four-necked flask having a volume of 3 liters and equipped with a reflux condenser, a thermometer, a nitrogen introduction tube, and stirring blades, and the temperature was elevated to 78° C. The above Solution A and Solution B were introduced dropwise into this reaction flask, simultaneously, under the following conditions:

Solution A: 80% of all the volume was introduced dropwise over 120 min, and the rest, 20% of all the volume, was introduced dropwise over 180 min;

Solution B: 80% of all the volume was introduced dropwise over 120 min, and the rest, 20% of all the volume, was introduced dropwise over 120 min.

After the completion of the dropping of Solution A and Solution B, the reaction was continued for a further 180 min, and then the reaction liquid was cooled to a temperature of 30° C. 1090 ml of ethyl acetate was added to this reaction liquid, so that the resultant polymer coupler would be diluted to have a concentration of 10% by weight, to obtain a homogeneous solution. The viscosity of the solution was 3 cps (centipoises) (measured at 25° C. by Brookfield viscosimeter).

To this solution, the FVD processing was carried out in the same manner as Example 1. The thus-obtained polymer coupler was 355.8 g (yield: 95.0%) of a powdery dry product containing 2.5 wt % of volatile components. The weight-average molecular weight measured by GPC was 18,500, and the viscosity ($\eta$=SP/C) was 0.075.

Further, the reactivity ratio of the monomers used herein was the same as those shown in Example 1.

Comparative Example 1

The reaction was carried out in the same manner as Example 1, except that Solution A, Solution B, and Solution C were introduced into the reaction flask all at once, instead of the dropwise addition. Even 7 hours after the introduction, the non-color-forming monomer reacted hardly at all.

Example 7

Copolymer E was prepared according to the following reaction scheme.

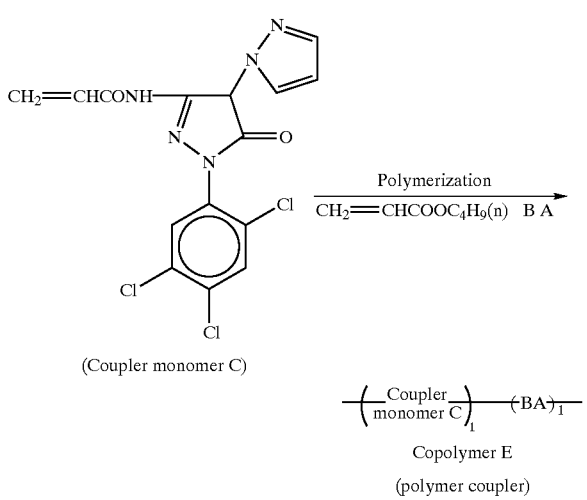

1000 ml of ethyl acetate, 20 mg of p-methoxyphenol, and 105 g of Coupler monomer C were charged into a three-necked flask having a volume of 2 liters and equipped with a reflux condenser, a thermometer, and stirring blades, and they were stirred to prepare a solution, which resulting solution was named Solution A.

Separately, 260 ml of ethyl acetate and 8 g of dimethyl-2,2'-azobisisobutyrate (hereafter referred to as V-601) were charged into a 300-ml beaker and stirred to dissolve the V-601, which resulting solution was named Solution B.

On the other hand, 90 ml of ethyl acetate and 100 g of butyl acrylate were charged into a four-necked flask having a volume of 2 liters and equipped with a reflux condenser, a thermometer, a nitrogen introduction tube, and stirring blades, and the temperature was elevated to 78° C. The above Solution A and Solution B were introduced dropwise into this reaction flask, simultaneously, under the following conditions:

Solution A: 56%, 32%, and 8% of all the volume were successively introduced dropwise over 67 min, 60 min, 45 min, respectively, and after 30 min, 2% of all the volume was introduced dropwise over 10 min, and after further 30 min, 2% of all the volume was introduced dropwise over 10 min;

Solution B: 56%, 32%, and 8% of all the volume were successively introduced dropwise over 67 min, 60 min, 45 min, respectively, and after 30 min, 2% of all the volume was introduced dropwise over 10 min, and after further 30 min, 2% of all the volume was introduced dropwise over 10 min.

After the completion of the dropping of Solution A and Solution B, 3 g of V-601 dissolved in 44 ml of ethyl acetate was added thereto. The reaction was continued for a further 420 min, and then the reaction liquid was cooled to a temperature of 30° C. To the reaction liquid, 30 ml of ethyl acetate was added, to obtain a homogeneous solution.

To this solution, the FVD processing was carried out in the same manner as Example 1, to obtain the polymer coupler of 204 g (yield: 95%) in the form of a powdery dry product containing 2.0 wt % of the volatile component. The weight-average molecular weight measured by GPC was 11,000, and the viscosity ($\eta$=SP/C) was 0.11.

The reactivity ratio of the monomers used herein was as shown in Table 3.

TABLE 3

Temperature 60° C.

(Coupler monomer C)/BA

| $r_1$ | $r_2$ | Solvent |
|---|---|---|
| 1.59 | 0.37 | Ethyl acetate |

When the thus-obtained Copolymer E (a polymer coupler) is used for a photographic light-sensitive material, a color image excellent in gradation can be obtained.

Having described our invention as related to the present embodiments, it is our intention that the invention not be limited by any of the details of the description, unless otherwise specified, but rather be construed broadly within its spirit and scope as set out in the accompanying claims.

What I claim is:

1. A method of producing a photographic copolymer coupler composed of at least three monomers having different reactivity as constitutional components: a monomer component A, a monomer component B and a monomer components C, comprising carrying out a polymerization while adding, dropwise, a solution of the monomer component B having higher reactivity than the monomer component A, dissolved in a non-aqueous solvent having a boiling point of 55° C. to 120° C. and a solution of monomer component C, to a solution of the monomer component A dissolved in a non-aqueous solvent having a boiling point of 55° C. to 120° C., in the presence of a polymerization initiator, wherein the said monomer components A and C are non-color-forming components and said monomer component B is a coupler component.

2. The method of producing a photographic copolymer coupler as claimed in claim 1, wherein the polymerization is carried out while adding the polymerization initiator.

3. The method of producing a photographic copolymer coupler as claimed in claim 1, wherein the addition of the monomer solutions are carried out continuously or intermittently, to carry out the polymerization.

4. The method of producing a photographic copolymer coupler as claimed in claim 1, further comprising carrying out a separation of the obtained photographic copolymer coupler, wherein the photographic copolymer coupler is separated as a solid with a flash vacuum dry system.

5. A method of producing a photographic copolymer coupler having at least two monomers as constitutional components: a monomer component A and a monomer component B, comprising carrying out a polymerization while adding, dropwise, a solution of the monomer component B dissolved in a non-aqueous solvent having a boiling point of 55° C. to 120° C., to a solution of the monomer component A dissolved in a non-aqueous solvent having a boiling point of 55° C. to 120° C., in the presence of a polymerization initiator, wherein the said monomer component B is a monomer coupler represented by the following formula (I), (II), or (III):

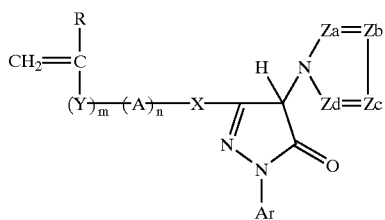

formula (I)

wherein R represents a hydrogen atom, a lower alkyl group having 1 to 4 carbon atoms, or a chlorine atom; X represents —CONH—, —NH—, —NHCONH—, or —NHCOO—; Y represents —CONH— or —COO—; A represents an unsubstituted or substituted straight-chain or branched alkylene group, or an unsubstituted or substituted phenylene group; Ar represents an unsubstituted or substituted phenyl group; Za, Zb, Zc, and Zd each represent methine, substituted methine, or —N═; and m and n are each 0 or 1;

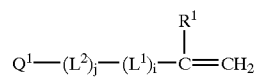

formula (II)

wherein $R^1$ represents a hydrogen atom, a chlorine atom, an alkyl group, or aryl group; $L^1$ represents —C(═O)N($R^2$)—, —C(═O)O—, —N($R^2$)C(═O)—, —OC(═O)—, formula (IV), formula (V), or formula (VI), shown below, in which $R^2$ represents a hydrogen atom, an alkyl group, an aryl group, or a heterocyclic group; $L^2$ represents a divalent linking group to link $L^1$ and $Q^1$, i is 0 or 1, j is 0 or 1, and $Q^1$ represents a yellow coupler residue capable of forming a yellow dye upon coupling with an oxidation product of an aromatic primary amine developing agent;

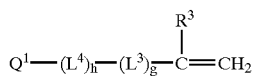

formula (III)

wherein $R^3$ has the same meaning as $R^1$, $L^3$ has the same meaning as $L^1$, $L^4$ has the same meaning as $L^2$, g has the same meaning as i, h has the same meaning as j, and $Q^2$ represents a cyan coupler residue capable of forming a cyan dye upon coupling with an oxidation product of an aromatic primary amine developing agent;

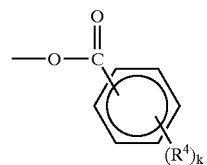

formula (IV)

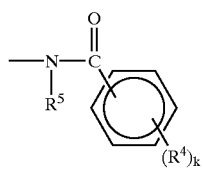

formula (V)

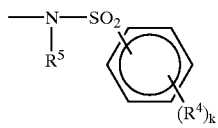

formula (VI)

wherein $R^4$ represents a substituent, $R^5$ has the same meaning as $R^2$, and k represents an integer of 0 to 4, wherein the said monomer component A is a non-color-forming monomer.

6. A silver halide photographic light-sensitive material, which contains a copolymer produced by a production method of a copolymer by polymerizing at least two monomers having different reactivity as constitutional components, wherein the production method comprises carrying out a polymerization while adding a monomer component B having high reactivity, to a solution of a monomer component A having low reactivity dissolved in a non-aqueous solvent having a boiling point of 55° C. to 120° C., in the presence of a polymerization initiator.

7. The silver halide photographic light-sensitive material as claimed in claim 6, wherein the copolymer is one selected from a group consisting of polymer couplers, acid polymers, anti-fading agent polymers, and polymers for dispersion.

8. The silver halide photographic light-sensitive material as claimed in claim 6, wherein the copolymer is a polymer coupler.

9. The method of producing a photographic copolymer as claimed in claim 5, wherein the polymerization is carried out while adding the polymerization initiator.

10. The method of producing a photographic copolymer as claimed in claim 2, wherein the adding time of the polymerization initiator is 120 to 500 minutes.

11. The method of producing a photographic copolymer as claimed in claim 9, wherein the adding time of the polymerization initiator is 120 to 500 minutes.

12. The method of producing a photographic copolymer as claimed in claim 1, wherein the adding time of the monomer component B is 120 to 400 minutes.

13. The method of producing a photographic copolymer as claimed in claim 5, wherein the adding time of the monomer component B is 120 to 400 minutes.

14. The method of producing a photographic copolymer as claimed in claim 1, wherein the nonaqueous solvent is an ester.

15. The method of producing a photographic copolymer as claimed in claim 5, wherein the nonaqueous solvent is an ester.

16. The method of producing a photographic copolymer coupler as claimed in claim 1, wherein the said monomer component A is selected from the group consisting of esters derived from acrylic acids, amides, vinyl esters, acrylonitrile, methacrylonitrile, aromatic vinyl compounds, itaconic acid, vinyl alkyl ethers, maleic acid esters and mixtures thereof.

17. The method of producing a photographic copolymer coupler as claimed in claim 16, wherein the said acrylic acids is selected from the group consisting of acrylic acid, α-chloroacrylic acid, and methacrylic acid.

18. The method of producing a photographic copolymer coupler as claimed in claim 16, wherein the said ester derived from acrylic acids is selected from the group consisting of methyl acrylate, methyl methacrylate, ethyl acrylate, n-propyl acrylate, n-butyl acrylate, and 2-ethylhexyl acrylate; and said amide is selected from the group consisting of acrylamide, methacrylamide, and t-butyl acrylamide.

19. The method of producing a photographic copolymer coupler as claimed in claim 1, wherein the said monomer component B is selected from the group consisting of esters derived from acrylic acids and amides derived from acrylic acids.

20. The method of producing a photographic copolymer coupler as claimed in claim 19, wherein the said acrylic acids is selected from the group consisting of acrylic acid, α-chloroacrylic acid, and methacrylic acid.

* * * * *